May 23, 1961 HANS-JOACHIM M. FÖRSTER 2,985,036
MOTOR VEHICLE TRANSMISSION
Filed March 30, 1954 2 Sheets-Sheet 1

INVENTOR
HANS-JOACHIM M. FÖRSTER
BY Dicke and Craig
ATTORNEYS

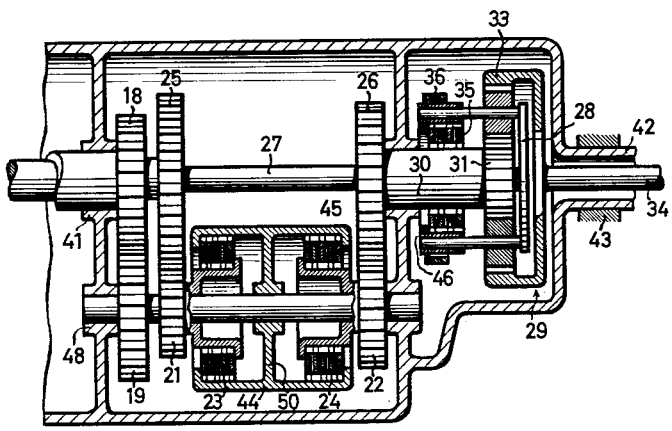
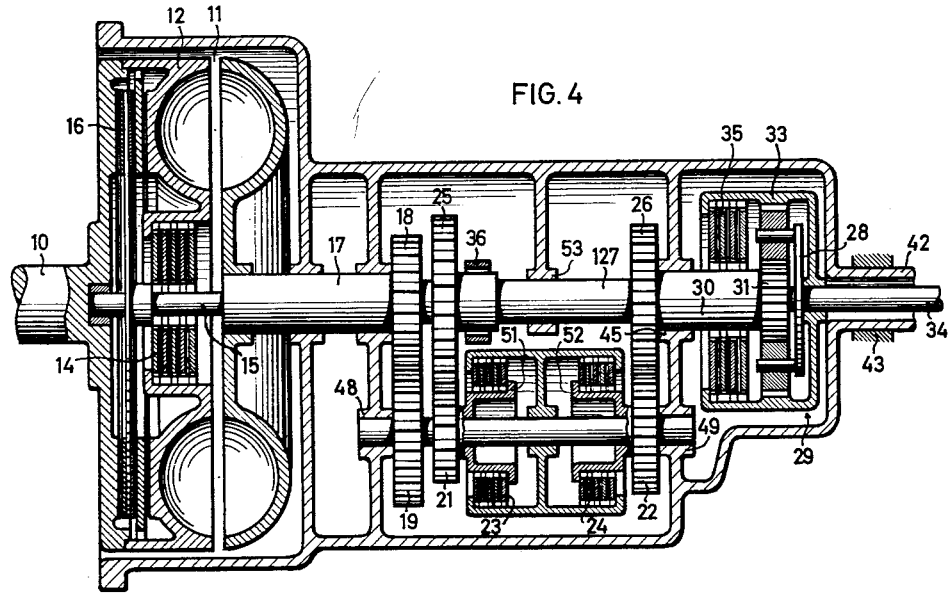

United States Patent Office 2,985,036
Patented May 23, 1961

2,985,036
MOTOR VEHICLE TRANSMISSION

Hans-Joachim M. Förster, Stuttgart-Bad Cannstatt, Germany, assignor to Daimler-Benz Aktiengesellschaft, Stuttgart-Unterturkheim, Germany Filed Mar. 30, 1954, Ser. No. 419,870

Claims priority, application Germany Apr. 1, 1953

20 Claims. (Cl. 74—740)

My invention relates to a transmission adapted to be set to any one of a plurality of speeds, particularly to a number of forward speeds and one reverse speed, such transmission being composed of an epicyclic gearing connected with the driving shaft by trains of motion-transmitting gears.

It is the primary object of the present invention to provide a transmission of the character described which is simple including a minimum of elements and yet may be set to a great number of speeds.

It is another object of the present invention to provide a motor vehicle transmission adapted to be shifted from one speed to another in a smooth and easy manner, such shifting operation involving the actuation of friction clutches for all speeds including the first speed.

Further objects of the present invention are to provide a transmission whereby any one of six forward speeds including two overdrives and a direct speed may be set up to effect the shifting operation of the transmission by the selective engagement and disengagement of friction clutches and brakes under pressure fluid control, and to provide a transmission which, when set up for any one of a plurality of lower speeds, transfers power from the driving shaft to the driven shaft through a hydrodynamic clutch permitting the vehicle to be stopped without stalling the engine and, when set up for a high speed, transfers power through a friction clutch bypassing said hydrodynamic clutch so as to minimize losses of energy thereof.

Figure 1:
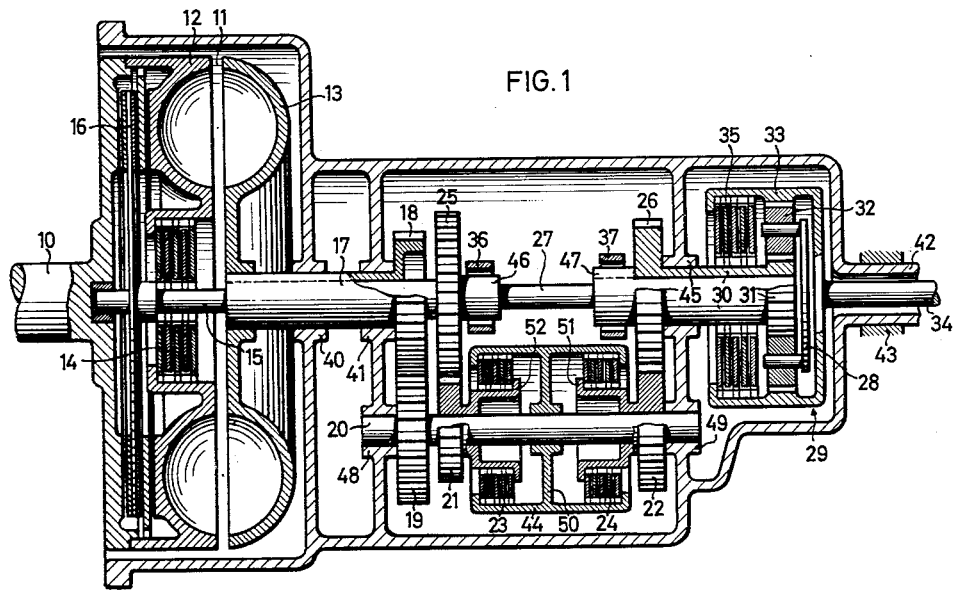
Figure 2:
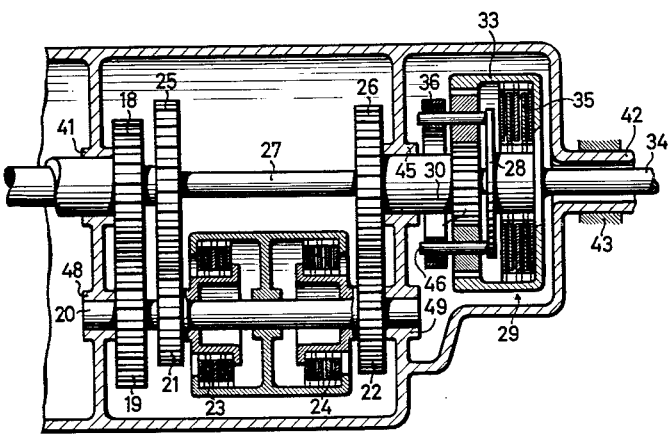

Further objects of the present invention will appear from a detailed description of a number of embodiments thereof following hereinafter, it being understood that such detailed description serves the purpose of illustrating the invention rather than that of limiting the scope thereof, the features of novelty covered by the patent being set forth in the appended claims. In the drawings, Fig. 1 is a more or less diagrammatic axial section through a motor vehicle transmission including an epicyclic gearing in which a clutch for locking the same connects an internally toothed outer gear and a sun gear of said gearing, Fig. 2 is a partial view similar to that of Fig. 1 of a modified embodiment in which the clutch serving to lock the epicyclic gearing is adapted to connect the carrier of the planetary gears with the internally toothed gear, Fig. 3 is a partial view similar to that of Fig. 1 of a third example of the present invention in which the clutch for locking the epicyclic gearing is adapted to connect the inner sun gear with the carrier of the planetary gears, and Fig. 4 is a sectional view of a motor vehicle transmission similar to that of Fig. 1, but differing therefrom by an extension of the driven shaft to a friction clutch for direct connection thereof with the driving shaft.

The driving shaft 10 which may be flanged to the crankshaft of the engine is rigidly connected with the primary section 12 of a hydrodynamic clutch 11, such primary section being rotatably mounted in a suitable bearing not shown and including a casting which cooperates with a similar casting carried by the secondary section 13 of the hydrodynamic clutch to constitute an annular chamber. Each of the sections 12 and 13 has vanes adapted to act on a liquid filling the annular chamber to thereby transfer the torque from section 12 to section 13. The secondary section 13 of the hydrodynamic clutch is provided with a hollow shaft 17 journalled in bearings 40 and 41 disposed in coaxial alignment with the driving shaft 10. In hollow shaft 17 there is mounted an inner shaft 15 adapted to carry a substantially annular device 16 which functions both as a means for absorbing any rotary vibrations that might be set up in shaft 15 and as a scooping element adapted to scoop up and remove the liquid from the annular chamber 12, 13 of the hydrodynamic clutch 11 when the feed of liquid thereto is cut off by a suitable control valve. A disengageable friction clutch 14, which is preferably of the multi-disk type, is provided in the space surrounded by the annular chamber 12, 13 of the hydrodynamic clutch 11 and serves to connect the driving shaft 10 and the clutch section 12 to the inner shaft 15. Preferably, clutch 14 comprises a set of disks mounted for common rotation with section 12, and an interleaved set of disks mounted for common rotation with shaft 15. The disks are relatively axially movable and adapted to be compressed by suitable means not shown adapted to be selectively actuated by a fluid under pressure, whereby the friction clutch 14 may be engaged or disengaged.

In bearings 43 and 43 disposed coaxially to the bearings 40 and 41 and to the driving shaft 10, the driven shaft 34 is journalled which may be geared to the driven wheels of the vehicle.

The transmission includes an epicyclic gearing 29 composed of three coaxial rotary elements. In the embodiment shown, such three elements comprise a sun gear 31, an internally toothed gear 33, and a carrier 28 of planetary gears 32 which mesh with the gears 31 and 33.

One of the three elements of the gearing 29, for instance the internally toothed gear 33, is conected with the driven shaft 34. The two other elements of the epicyclic gearing, such as the elements 28 and 31, may be selectively connected to the driving shaft 10 by a pair of trains of motion-transmitting gears. The first train of motion-transmitting gears which connects the sun gear 31 with the driving shaft 10 comprises a hollow shaft 30 carrying sun gear 31 and mounted in axial alignment with the driving shaft 10 and the driven shaft 34 in suitable bearings, such as 45, and a pair of meshing gears 26 and 22, the gear 26 being rigidly mounted on hollow shaft 30 and the gear 22 being rotatably mounted on and adapted to be conected by a disengageable friction clutch 24 to a secondary shaft 20 which extends parallel to the axis of the driving shaft 10 and the driven shaft 34 and is common to both trains of motion-transmitting gears being mounted in bearings 48 and 49. The secondary shaft 20 is geared to the hollow shaft 17 by a pair of gears 19 and 18. Thus, motion may be transmitted from the driving shaft 10 through the hydrodynamic clutuch 11, shaft 17, pair of gears 18 and 19, secondary shaft 20, clutch 24, pair of gears 22 and 26, and hollow shaft 30 to the sun gear 31.

The second train of motion-transmitting gears is provided to connect the element 28 of the epicyclic gearing, to wit the carrier of planetary gears, to the driving shaft 10. This second train comprises a shaft 27 which, in the embodiments of Figs. 1, 2 and 3, constitutes an extension of shaft 15 and is journalled within the hollow shaft 30, and a gear 25 fixed to shaft 27 and meshing with a gear 21 which is rotatably mounted on the secondary shaft 20 and adapted to be clutched thereto by a disengageable friction clutch 23. Therefore, when clutch 23 is in an engaged condition, motion will be transmitted from shaft 10 to the planetary gear carrier 28 through the intermediary of the elements 12, 13, 17, 18, 19, 23, 21, 25 and 27.

The epicyclic gearing may be locked to cause its three elements to revolve in unison. For that purpose, a disengageable clutch 35 is provided which is adapted to clutch two of the three elements of the epicyclic gearing to each other.

In the embodiment shown in Fig. 1, such two elements are the internally toothed gear 33 and the sun gear 31. In the embodiment shown in Fig. 2, such two elements are the internally toothed gear 33 and the planetary gear carrier 28. In the embodiment shown in Fig. 3, such two elements are the planetary gear carrier 28 and the sun gear 31. In either case, engagement of clutch 35 causes the three elements of the epicyclic gearing to revolve in unison.

The carrier 28 of planetary gears may be arrested by means of a brake 36. This brake acts on a drum 46 which, in the embodiment shown in Fig. 1, is rigidly connected with gear 25, and in the embodiments shown in Figs. 2 and 3 is directly mounted on and rigid with the carrier 28 of the planetary gears.

Moreover, means may be provided to arrest sun gear 31 by a brake 37. In the embodiment shown in Fig. 1, such brake 37 is mounted to act on a drum 47 rigidly connected with gear 26. Each of the disengageable clutches 23, 24 and 35 may be similar to the disengageable clutch 14 described hereinabove being likewise adapted to be selectively engaged or disengaged by the selective control of fluid pressure connecting suitable elements not shown.

The component parts of the different disengageable clutches have preferably the same dimensions so as to be exchangeable. This will simplify the manufacture and will reduce the number of spare parts that must be available for repair.

Each of the clutches 23 and 24 comprises two interleaved sets of disks, one set being carried for common rotation by a drum 44 having a partition 50 fixed to shaft 20, and the other set being carried by a hub 51, or 52 respectively, rigid with the associated gear 22 or 21.

From the foregoing description it will appear that the first train of motion-transmitting gears connecting the driving shaft 10 to one element of the epicyclic gearing 29 comprises the members 12, 13, 17, 18, 19, 20, 23, 21, 25 and 27, and that the second train of motion-transmitting gears connecting the driving shaft 10 to another element of the epicyclic gearing 29 comprises the members 12, 13, 17, 18, 19, 20, 24, 22, 26 and 30. Either of the two trains constitutes a speed-reducing gearing, as will appear from Fig. 1 showing that gear 19 is larger than gear 18 and gears 25 and 26 are larger than gears 21 and 22. Therefore, both of the shafts 27 and 30 will revolve at a lower speed than the driving shaft 10.

Moreover, it will appear from the foregoing description that there is a first pair of gears 18 and 19 common to the two trains of motion-transmitting gears and provided to cooperatively connect the secondary shaft 20 to the hydrodynamic clutch 11, a second pair of gears 21, 25 included in the first train and adapted by the second disengageable clutch 23 to be rendered able or unable to transfer motion, a third pair of gears 22 and 26 included in the second train and adapted by the third disengageable clutch 24 to be rendered able or unable to transfer motion, the first disengageable clutch being the clutch 35, and a fourth disengageable clutch being constituted by clutch 14.

The function of the transmission shown in Figs. 1, 2 and 3 is as follows:

For setting up the transmission to first speed, i.e. the lowest forward speed of the driven shaft 34, the clutches 23 and 24 are engaged, while clutches 14 and 35 and brakes 36 and 37 are disengaged. Motion will be transmitted from the driving shaft 10 through the hydrodynamic clutch 11, hollow shaft 17, set of gears 18, 19 to secondary shaft 20. From here, the power transmitted will be split, part of the power being transferred through the pair of gears 21, 25 to the carrier 28 of planetary gears, and the other part of the power being transferred through the pair of gears 22, 26 and the hollow shaft 30 to the sun gear 31 of the planetary gearing. In this operation, the sun gear 31 will be driven at a higher rotary speed than the planetary gear carrier 28, both revolving in the same direction. As a result, the internally toothed gear 33 and the driven shaft 34 connected therewith will revolve at an extremely low speed.

For shifting the transmission to the second forward speed, clutches 23 and 35 are engaged, while clutches 14 and 24 and brakes 36 and 37 are disengaged. Due to the engagement of clutch 35, the epicyclic gearing is locked causing its elements to revolve in unison. Motion is transferred from the driving shaft to the driven shaft through the pair of gears 18 and 19 and the pair of gears 21 and 25. The shafts 27 and 34 revolve in unison since they are rigidly connected with different elements of the locked epicyclic gearing 29.

For shifting the transmission to the third forward speed, the clutches 24 and 35 are engaged, while the clutches 14 and 23 and the brakes 36 and 37 are disengaged. Motion is transferred from the driving shaft 10 to the driven shaft 34 through the pair of gears 18 and 19 and the pair of gears 22 and 26. The shafts 30 and 34 being connected to different elements of the locked epicyclic gearing rotate in unison. While shaft 27 and gear 25 partake in such rotation causing gear 21 to rotate, the latter will run idly on the secondary shaft 20 since the clutch 23 is disengaged.

For shifting the transmission to the fourth or direct speed, the clutches 14 and 35 are engaged, while clutches 23 and 24 are disengaged. As a result, power will be transferred from driving shaft 10 through the primary section 12 of the hydrodynamic clutch, the engaged friction clutch 14 and shaft 15 to the epicyclic gearing 29 which is locked, and thus transfers the rotation to the driven shaft 34. In this operation, the pair of gears 18, 19 and the secondary shaft 20 may run idly while being driven by the secondary section 13 of the hydrodynamic clutch. Hence, it will appear that the direct transfer of power from the driving shaft 10 to the driven shaft 34 via the clutches 14 and 35 bypasses the hydrodynamic clutch 11 thus minimizing loss of energy in the latter.

A fifth forward speed or overdrive may be effected by engaging clutches 14 and 24 and by disengaging clutches 23 and 35 and the brakes 36 and 37. The power transferred to section 12 of the hydrodynamic clutch is split, one share of the power being transferred through the friction clutch 14 to the shafts 15, 27 and the carrier 28 of the epicyclic gear, and the other share of the power being transferred through the secondary section 13 of the hydrodynamic clutch, hollow shaft 17, pair of gears 18 and 19, secondary shaft 20, friction clutch 24, pair of gears 22, 26 and hollow shaft 30 to the sun gear 31. The elements 31 and 28 revolve in the same direction at such speeds that the internally toothed gear 33 and the driven shaft 34 rigidly connected therewith will be driven at a speed higher than that of the shafts 10, 15 and 27.

A sixth forward speed constituting a second overdrive may be set up by engaging clutch 14 and brake 37 and by disengaging clutches 23, 24 and 35. In this event, the planetary gear carrier 28 will revolve in unison with driving shaft 10, clutch 11 and shafts 15 and 27, while the sun gear 31 will be held stationary by brake 37. As a result, gear 33 and the driven shaft 34 rigid therewith will be driven at a considerably higher speed than shaft 27 in the same direction of rotation.

For setting up the reverse speed, the clutch 24 and brake 36 are engaged, whereas clutches 14, 23 and 35 and brake 37 are disengaged. As a result, brake 36 will arrest the planetary gear carrier 28, whereas the sun gear 31 will be driven through the train of motion-transmitting gears including the pair of gears 26 and 22 and the pair of gears 18 and 19 as well as the hydrodynamic clutch and the hollow shaft 17. The planetary gears 32 revolving about axes held stationary will transmit the rotation in reverse direction to the internally toothed gear 33 and the driven shaft 34.

The embodiment shown in Fig. 1 offers the advantage over those shown in Figs. 2 and 3 that the torque to be transferred by the disengageable clutch 35 is a minimum.

The embodiment of Fig. 3 is to be preferred where the space available adjacent to gear 25 is insufficient to accommodate the brake 36.

The embodiment of my invention shown in Fig. 4 differs from the examples illustrated in Figs. 1, 2 and 3 in that shaft 127 which is the shaft carrying gear 25 is not rigidly connected with, but is relatively rotatable to shaft 15 and is formed by a hollow sleeve journalled in a bearing 53 disposed adjacent to gear 25, the shaft 15 extending through the hollow shaft 127 and being rigid or integral with the driven shaft 34 and with the internally toothed gear 33. In this embodiment, the fourth or direct speed does no longer require engagement of clutch 35, since the power is directly transferred through the engaged clutch 14 from the driving shaft 10 and shaft 15 to the driven shaft 34, such power transfer bypassing both the hydrodynamic clutch 11 and the epicyclic gearing 29. Otherwise the embodiment shown in Fig. 4 is similar to that shown in Fig. 1, the same reference numerals having been used to denote the various component parts.

While I have shown four specific relative dispositions of the brake 36 and the clutch 35, my invention is in no way limited thereto since brake 36 and clutch 35 may be relatively mounted in numerous other ways.

While I have shown the brake 37 in Fig. 1, it will be readily understood that similar brakes 37 may be also provided in the other embodiments.

Whereas either one of the two trains of motion-transmitting gears includes two pairs of gears in each of the embodiments described, it will be readily understood that any desired number of pairs of gears may be included in such trains.

Generally speaking, it is to be clearly understood that while I have given a detailed description of a number of different embodiments of my invention, the same is in no way restricted to such details, but is capable of numerous modifications as will readily occur to anyone skilled in the art within the scope of the appended claims.

What I claim is:

1. A motor vehicle change-speed transmission adapted to be set to any one of a plurality of transmission ratios comprising a driving shaft, a driven shaft, an epicyclic gearing composed of three coaxial rotary elements including a carrier for planetary gears, a first train of motion transmitting means including a first set of gears operatively connecting one of said elements with said driving shaft, a second train of motion transmitting means operatively connecting another one of said elements with said driving shaft, said second train of motion transmitting means including in common some of the gears of said first train of motion transmitting means and further gears separate from the gears of said first train and disposed between said common gears and said another element, a third one of said elements being connected to said driven shaft, a disengageable clutch for clutching two of said elements to each other to thereby lock said epicyclic gearing, a brake for arresting said carrier of planetary gears, and means for individually disabling and enabling said first train and said second train of motion transmitting means to transmit torque between said driving shaft and said driven shaft.

2. Transmission as claimed in claim 1 in which said three elements comprise a sun gear, an internally toothed gear, and a carrier of planetary gears meshing therewith, said internally toothed gear constituting the one of said elements connected with the driven shaft, each of said train of motion-transmitting means providing a speed-reducing ratio.

3. Transmission as claimed in claim 1 in which an additional disengageable clutch is interposed between said driving shaft and one of said elements of said epicyclic gearing for direct speed transfer.

4. Transmission as claimed in claim 1 in which an additional disengageable clutch is operatively connected between said driving shaft and said driven shaft.

5. Transmission as claimed in claim 1 comprising a hydrodynamic clutch common to both of said trains for connecting the same to said driving shaft, a pair of disengageable friction clutches, each included in one of said trains, and an additional disengageable friction clutch for effectively enabling a direct transfer of power from the driving shaft to said driven shaft, said direct transfer bypassing said hydrodynamic clutch.

6. Transmission as claimed in claim 1, further comprising another brake operatively connected with said second train of motion-transmitting means for arresting said other one of said elements of said epicyclic gearing.

7. Transmission as claimed in claim 1, further comprising another brake operatively connected with said second train of motion-transmitting means for arresting said other one of said elements of said epicyclic gearing, said third one of said elements of said epicyclic gearing connected with said driven shaft being constituted by an internally toothed gear, while said two first mentioned elements are constituted by a sun gear and a planetary gear carrier carrying planetary gears meshing with said sun gear and said internally toothed gear.

8. Motor vehicle transmission adapted to be set to any one of a plurality of ratios of transmission comprising a driving shaft, a driven shaft, an epicyclic gearing composed of three coaxial rotary elements including a carrier of planetary gears, a first train of motion-transmitting means including gears connecting one of said elements with said driving shaft, a brake operatively connected with said first train and adapted to arrest said last mentioned one of said elements, a second train of motion-transmitting means including gears for connecting another one of said elements to said driving shaft, a first disengageable friction clutch between two of said elements to clutch said two elements directly to each other to thereby lock said epicyclic gearing upon engagement of said first disengageable friction clutch, a second disengageable friction clutch included in said first train of motion-transmitting means, a third disengageable friction clutch inserted in said second train of motion-transmitting means, a fourth disengageable friction clutch interposed between said driving shaft and one of said elements of said epicyclic gearing for direct speed transfer, and a hydrodynamic clutch common to both of said trains for connecting the same to said driving shaft.

9. Transmission as claimed in claim 8 comprising a second brake operatively connected with said second train and adapted to arrest said other one of said elements.

10. A motor vehicle transmission adapted to be set to any one of a plurality of ratios of transmission comprising a driving shaft, a driven shaft, an epicyclic gearing composed of three coaxial rotary elements including a carrier of planetary gears, a first train of motion-transmitting means including gears connecting one of said elements with said driving shaft, a brake operatively connected with said first train and adapted to arrest said last-mentioned one of said elements, a second train of motion-transmitting means including gears for connecting another one of said elements to said driving shaft, a first disengageable friction clutch adapted to clutch two of said elements to each other to thereby lock said epicyclic gearing, a second disengageable friction clutch included in said first train of motion-transmitting means, a third disengageable friction clutch inserted in said second train of motion-transmitting means, a fourth disengageable friction clutch interposed between said driving shaft and one of said elements of said epicyclic gearing for direct speed transfer, a hydrodynamic clutch common to both of said trains for connecting the same to said driving shaft, said driving shaft, said fourth disengageable clutch, said hydrodynamic clutch, said first disengageable friction clutch, said epicyclic gearing, and said driven shaft being mounted in coaxial alignment, a secondary shaft extending parallel to the axis of said driving shaft and said driven shaft and being common to both of said trains, a first pair of gears common to said trains for cooperatively connecting said secondary shaft to said hydrodynamic clutch, a second pair of gears included in said first train enabled and disabled to transfer motion by said second disengageable clutch, and a third pair of gears included in said second train and adapted by said third disengageable clutch to be rendered able or unable to transfer motion.

11. Transmission as claimed in claim 10 in which said brake operatively connected with said first train and adapted to arrest one of the elements of said epicyclic gearing is mounted for engagement with one gear of said second pair of gears.

12. Transmission as claimed in claim 1 in which said three elements of the epicyclic gearing comprise a sun gear connected to said second train, an internally toothed gear connected to said driven shaft, and a carrier of planetary gears meshing with said sun gear and said internally toothed gear, said carrier being connected to said first train, said disengageable clutch being adapted to clutch said sun gear to said internally toothed gear.

13. Transmission as claimed in claim 1 in which said epicyclic gearing comprises a carrier of planetary gears connected to said first train, a sun gear connected to said second train, an internally toothed gear connected to said driven shaft, said planetary gears meshing with said sun gear and said internally toothed gear, said disengageable clutch being adapted to clutch said internally toothed gear to said carrier of planetary gears, a second disengageable clutch included in said first train, and a releasable brake mounted for engagement with said carrier and adapted to arrest the same when said second clutch is disengaged thereby disabling said first train to transmit motion to said carrier.

14. A motor vehicle transmission adapted to be set to any one of a plurality of ratios of transmissions comprising a driving shaft, a driven shaft, an epicyclic gearing composed of three coaxial rotary elements including a carrier of planetary gears, a first set of speed-change gears adapted to be connected to said driving shaft, a first train of motion-transmitting means including gears connecting one of said elements with said first set of speed-change gears, a second train of motion-transmitting means including further gears for connecting another one of said elements to said first set of speed-change gears, a third one of said elements being connected with said driven shaft, a disengageable clutch for clutching two of said elements to each other to thereby lock said epicyclic gearing, a brake for arresting said carrier of planetary gears, and means for individually disabling and enabling said first and said second trains of motion-transmitting means to transmit torque between said driving shaft and said driven shaft.

15. A motor vehicle transmission according to claim 14, wherein said driven shaft is coaxial with said driving shaft.

16. A motor vehicle transmission adapted to be set to any one of a plurality of ratios of transmission comprising a driving shaft, a driven shaft, an epicyclic gearing composed of three coaxial rotary elements including a carrier of planetary gears, a first set of change-speed gears adapted to be connected to said driving shaft, a first train of motion-transmitting means including gears connecting one of said elements with said first set of change-speed gears, a brake operatively connected with said first train and adapted to arrest said last-mentioned one of said elements, a second train of motion-transmitting means including gears for connecting another one of said elements to said first set of change-speed gears, a first disengageable friction clutch adapted to clutch two of said elements to each other to thereby lock said epicyclic gearing, a second disengageable friction clutch included in said first train of motion-transmitting means, a third disengageable friction clutch inserted in said second train of motion-transmitting means, a fourth disengageable friction clutch interposed between said driving shaft and one of said elements of said epicyclic gearing for direct speed transfer, and a hydrodynamic clutch common to both of said trains for connecting the same to said driving shaft.

17. A motor vehicle transmission according to claim 16, wherein said driving shaft and said driven shaft are mounted in coaxial alignment.

18. A motor vehicle change-speed transmission adapted to be set to any one of a plurality of transmission ratios, comprising a driving shaft, a driven shaft, an epicyclic gearing composed of three coaxial rotary elements including a carrier for planetary gears, a first train of motion-transmitting means including a first shaft and a set of gears operatively connecting one of said elements with said driving shaft, a second train of motion-transmitting means operatively connecting another one of said elements with said driving shaft and including a second shaft, said second train of motion-transmitting means including in common some of the gears of said first train of motion-transmitting means and further gears separate from the gears of said first train and disposed between said common gears and said another element, a third one of said elements being connected to said driven shaft, a disengageable clutch for clutching two of said elements to each other to thereby lock said epicyclic gearing, a brake for arresting said carrier of planetary gears, and means operatively connecting in each speed at least one of said first and second shafts with said driving shaft for individually disabling and enabling said first train and said second train of motion-transmitting means to transmit torque between said driving shaft and said driven shaft.

19. A motor vehicle change-speed transmission according to claim 18, wherein said last-mentioned means includes engageable means for selectively connecting said driving shaft with one of said first and second shafts.

20. A motor vehicle change-speed transmission according to claim 18, wherein said last-mentioned means includes engageable means for selectively connecting said driving shaft with one of said first and second shafts, and hydrodynamic means operatively connecting said driving shaft with the other of said first and second shafts.

References Cited in the file of this patent

UNITED STATES PATENTS

| | | |
|---|---|---|
| 1,935,018 | Chambers | Nov. 14, 1933 |
| 2,334,402 | Flinn | Nov. 16, 1943 |
| 2,605,650 | Winther et al. | Aug. 5, 1952 |
| 2,692,516 | O'Leary | Oct. 26, 1954 |
| 2,719,442 | O'Leary | Oct. 4, 1955 |
| 2,747,430 | Forster et al. | May 29, 1956 |
| 2,749,775 | Simpson | June 12, 1956 |

FOREIGN PATENTS

| | | |
|---|---|---|
| 879,518 | Germany | June 15, 1953 |